United States Patent
Holmes

(10) Patent No.: US 12,499,773 B2
(45) Date of Patent: Dec. 16, 2025

(54) APPARATUS, METHOD AND SYSTEM FOR PROVIDING PILOT ADVISORIES ON TRAJECTORY MANAGEMENT USING CONTINUOUS REPLANNING OF DYNAMICALLY INTERACTING TRAJECTORIES FOR OPTIMAL ECONOMIC AND SAFETY OUTCOMES

(71) Applicant: SMARTSKY NETWORKS LLC, Morrisville, NC (US)

(72) Inventor: Bruce J. Holmes, Williamsburg, VA (US)

(73) Assignee: SMARTSKY NETWORKS LLC, Morrisville, NC (US)

( * ) Notice: Subject to any disclaimer, the term of this patent is extended or adjusted under 35 U.S.C. 154(b) by 197 days.

(21) Appl. No.: 16/339,191

(22) PCT Filed: Oct. 10, 2017

(86) PCT No.: PCT/US2017/055871
§ 371 (c)(1),
(2) Date: Apr. 3, 2019

(87) PCT Pub. No.: WO2018/071377
PCT Pub. Date: Apr. 19, 2018

(65) Prior Publication Data
US 2019/0311631 A1    Oct. 10, 2019

Related U.S. Application Data

(60) Provisional application No. 62/406,447, filed on Oct. 11, 2016.

(51) Int. Cl.
*G08G 5/55*    (2025.01)
*G01C 23/00*   (2006.01)
(Continued)

(52) U.S. Cl.
CPC ............... *G08G 5/55* (2025.01); *G01C 23/00* (2013.01); *G05D 1/0202* (2013.01); *G08G 5/21* (2025.01);
(Continued)

(58) Field of Classification Search
CPC .. G08G 5/0013; G08G 5/0021; G08G 5/0039; G08G 5/006; G08G 5/0008;
(Continued)

(56) References Cited

U.S. PATENT DOCUMENTS 6,756,937 B1    6/2004  Chang et al.
7,471,995 B1 *  12/2008  Robinson ............... G01C 23/00
                                                340/901

(Continued)

FOREIGN PATENT DOCUMENTS

CN    104053044 A    9/2014
EP      2574965 A2   4/2013
(Continued)

OTHER PUBLICATIONS

International Search Report and Written Opinion of corresponding International Application No. PCT/US2017/055871 mailed Feb. 6, 2018, all enclosed pages cited.

(Continued)

*Primary Examiner* — Aniss Chad
*Assistant Examiner* — Stephanie T Su
(74) *Attorney, Agent, or Firm* — Burr & Forman

(57) ABSTRACT

An aviation advisory module may include processing circuitry configured to receive data indicative of internal factors and external factors related to route optimization of an aircraft. At least some of the external factors may include dynamic parameters that are changeable while the aircraft is in-flight. The processing circuitry may also be configured to receive updates to the dynamic parameters via a wireless
(Continued)

communication network that includes a high bandwidth return link from the aircraft while the aircraft is in-flight, update trajectory deconfliction of a trajectory of the aircraft and trajectories of one or more other aircraft, and generate a guidance output associated with a route of the aircraft based on integration of the dynamic parameters, the trajectory deconfliction and the internal factors.

17 Claims, 4 Drawing Sheets

(51) Int. Cl.
G05D 1/00 (2024.01)
G08G 5/21 (2025.01)
G08G 5/22 (2025.01)
G08G 5/25 (2025.01)
G08G 5/26 (2025.01)
G08G 5/30 (2025.01)
G08G 5/34 (2025.01)
G08G 5/53 (2025.01)
G08G 5/59 (2025.01)
G08G 5/72 (2025.01)
G08G 5/76 (2025.01)
G08G 5/80 (2025.01)
H04B 7/185 (2006.01)

(52) U.S. Cl.
CPC .............. *G08G 5/22* (2025.01); *G08G 5/25* (2025.01); *G08G 5/26* (2025.01); *G08G 5/30* (2025.01); *G08G 5/34* (2025.01); *G08G 5/53* (2025.01); *G08G 5/59* (2025.01); *G08G 5/723* (2025.01); *G08G 5/727* (2025.01); *G08G 5/76* (2025.01); *G08G 5/80* (2025.01); *H04B 7/18506* (2013.01)

(58) Field of Classification Search
CPC .... G08G 5/0026; G08G 5/003; G08G 5/0052; G08G 5/0078; G08G 5/0082; G08G 5/0091; G08G 5/045; G01C 23/00; G05D 1/0202; H04B 7/18506
See application file for complete search history.

(56) References Cited

U.S. PATENT DOCUMENTS

| | | | |
|---|---|---|---|
| 7,720,630 B1 | 5/2010 | Miller et al. | |
| 8,918,280 B1* | 12/2014 | Heinrich | G08G 5/0047 |
| | | | 701/416 |
| 10,026,325 B2* | 7/2018 | Hamilton | G06Q 50/40 |
| 2004/0183695 A1 | 9/2004 | Ruokangas et al. | |
| 2010/0142482 A1 | 6/2010 | Lu et al. | |
| 2013/0070677 A1* | 3/2013 | Chang | H04B 7/18515 |
| | | | 370/328 |
| 2014/0241239 A1 | 8/2014 | Chang | |
| 2014/0266896 A1* | 9/2014 | Hyslop | H04B 7/18506 |
| | | | 342/368 |
| 2014/0282747 A1* | 9/2014 | Richman | H04N 21/2146 |
| | | | 725/62 |
| 2016/0093217 A1 | 3/2016 | Hale et al. | |
| 2016/0140853 A1* | 5/2016 | Smith | G08G 5/34 |
| | | | 701/423 |
| 2016/0155340 A1 | 6/2016 | Watts | |
| 2016/0180715 A1 | 6/2016 | Burke et al. | |
| 2016/0205560 A1 | 7/2016 | Hyslop et al. | |
| 2017/0357273 A1* | 12/2017 | Michini | G05D 1/106 |
| 2018/0096608 A1* | 4/2018 | Westervelt | G08G 5/20 |

FOREIGN PATENT DOCUMENTS

| | | | |
|---|---|---|---|
| EP | 2775470 A2 | 9/2014 | |
| EP | 2974075 A2 | 1/2016 | |
| JP | 2006321475 A | 11/2006 | |
| JP | 2012174266 A | 9/2012 | |
| JP | 7061128 B2 | 4/2022 | |
| WO | WO-2014149405 A2 * | 9/2014 | ......... H04B 7/18506 |
| WO | 2016140853 A1 | 10/2016 | |
| WO | 2016154939 A1 | 10/2016 | |
| WO | 20160154948 A1 | 10/2016 | |

OTHER PUBLICATIONS

Chapter I International Preliminary Report on Patentability of corresponding International Application No. PCT/US2017/055871 mailed Apr. 25, 2019, all enclosed pages cited.
Office action from corresponding European patent application No. 17791515.4-1203 dated Jul. 14, 2020, all enclosed pages cited.
Summons to Attend Oral Proceedings issued in corresponding European Application No. 17791515.4 on Feb. 18, 2021, all enclosed pages cited.
Office action from corresponding Chinese patent application No. 2017800749854 dated May 6, 2021, all enclosed pages cited.
Search report from corresponding Chinese patent application No. 2017800749854 dated Apr. 25, 2021, all enclosed pages cited.
Notice of Allowance from corresponding Japanese Application No. 2019-540299 mailed Mar. 29, 2022, all pages cited in its entirety.
"Research on Wideband Ground-Air Communication with Low Elevation", Manfeng fei, "Wanfang Data", Apr. 29, 2009, all pages cited in its entirety.
"Research on Communication Mechanism and Anti-jamming Performance based on Fast Frequency Hopping System in Data Link", Xiaoyu Zhang, China Master's Theses Full-text Database, Feb. 15, 2016, all pages cited in its entirety.
Subsequent Office Action from Chinese Application No. 201780074985.4 mailed Nov. 12, 2021, all pages cited in its entirety.
First Examination Report from Indian Application No. 201970156611 mailed Dec. 2, 2021, all pages cited in its entirety.
Extended European Search Report from European Application No. 21200166.3 dated Mar. 14, 2022, all pages cited in its entirety.
Notice of Rejection received from Chinese Application No. 201780074985.4 mailed Apr. 8, 2022, all pages cited in its entirety.
Office Action issued in corresponding European Patent Application No. 21 200 166.3 mailed Jun. 20, 2024, all pages cited in its entirety.
Document 5A/TEMP/70: "Systems for public mobile communications with aircraft"; 3GPP Draft; 198ANNEX14; 3rd Generation Partnership Project (3GPP); Mobile Competence Centre; 650, Route Des Lucioles ; F-06921 Sophia-Antipolis Cedex ; FRANCE; vol. TSG RAN Nov. 24, 2012 ( Nov. 24, 2012); XP051633583; URL: <http://www.3gpp.org/ftp/tsg%5Fran/TSG%5FRAN/TSGR%5F58/Docs/RP%2D121506%2Ezip>.

* cited by examiner

APPARATUS, METHOD AND SYSTEM FOR PROVIDING PILOT ADVISORIES ON TRAJECTORY MANAGEMENT USING CONTINUOUS REPLANNING OF DYNAMICALLY INTERACTING TRAJECTORIES FOR OPTIMAL ECONOMIC AND SAFETY OUTCOMES

CROSS REFERENCE TO RELATED APPLICATIONS

This application claims priority to U.S. Ser. No. 62/406,447 filed Oct. 11, 2016, the entire contents of which are hereby incorporated herein by reference.

TECHNICAL FIELD

Example embodiments generally relate to the aviation industry and, more particularly, relate to the ability to provide pilot advisories to an in-flight aircraft.

BACKGROUND

The market for mobile device-based applications is currently populated with a large number of products that provide pilots with improved means for traditional flight planning (e.g., ForeFlight, Garmin Pilot, Jeppesen TC, JeppVFR, WingXPro, Fly!, My Wingman, ARINC Direct, AeroVie, Xavion, RocketRoute, iFlightPlanner, FlightPlan.com, and others). These products perform a useful function in translating the traditional, largely manual means of planning flights into electronic applications (apps). These apps streamline the pre-flight planning process through simplified access to weather, airspace, and aircraft data, as well as through automating calculations formerly requiring manual processing.

However, none of the current products provide any capability for the integration of continuous re-planning, based on ingestion of continuously (or periodically) changing forecasts, accounting for dynamically changing airspace constraints and traffic flows, with optimization of flight trajectory objectives, to provide advisories to pilots that account for all the external and internal factors affecting the trajectories. External factors include the airspace, rules and procedures, and atmospheric environment within which an aircraft operates. Internal factors include pilot or fleet manager objectives and preferences related to aircraft operations. Provision of the data and information required to continuously (or periodically) re-optimize flight paths requires bi-directional connectivity between the aircraft and sources of those data and information. Existing aviation connectivity solutions are limited in sufficient bandwidth to and from the aircraft; and latency (time delay) of messages between the aircraft and ground-based data centers thereby effectively barring the current products from taking any steps toward improving their offerings.

In summary, existing applications simply codify the traditional methods for management of pre-flight planning functions in digital form without any significant innovation in how flight trajectories can be optimally managed in the context of changing weather, traffic and airspace to the benefit of safety and efficiency. Further, the use of existing applications over current aviation connectivity links cannot be affordably and efficiently employed in practical operations for large varieties of commercial, business, general aviation, and unscrewed aerial system (UAS) users.

BRIEF SUMMARY OF SOME EXAMPLES

Some example embodiments may therefore be provided to overcome some of the limitations described above within the context of a system that provides improved connectivity to support real-time, optimal management of flight paths.

In one example embodiment, an aviation advisory module is provided. The module may include processing circuitry configured to receive data indicative of internal factors and external factors related to route optimization of an aircraft. At least some of the external factors may include dynamic parameters that are changeable while the aircraft is in-flight. The processing circuitry may also be configured to receive updates to the dynamic parameters via a wireless communication network that includes a high bandwidth, low latency return link from the aircraft while the aircraft is in-flight; that updates trajectory deconfliction between a trajectory of the aircraft and trajectories of one or more other aircraft, traffic flows, weather or exclusionary airspace; and that generates a guidance output and diagnostic information associated with a new route of the aircraft based on integration of the dynamic parameters, the trajectory deconfliction and the internal factors.

In another example embodiment, a method for providing aviation advisories is provided. The method may include receiving data indicative of internal factors and external factors related to route optimization of an aircraft. At least some of the external factors may include dynamic parameters that are changeable while the aircraft is in-flight. The method may further include receiving updates to the dynamic parameters via a wireless communication network that includes a high bandwidth, low latency return link from the aircraft while the aircraft is in-flight, updating trajectory deconfliction between a trajectory of the aircraft and trajectories of one or more other aircraft or traffic flows, and generating a guidance output associated with a new route of the aircraft based on integration of the dynamic parameters, the trajectory deconfliction and the internal factors.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
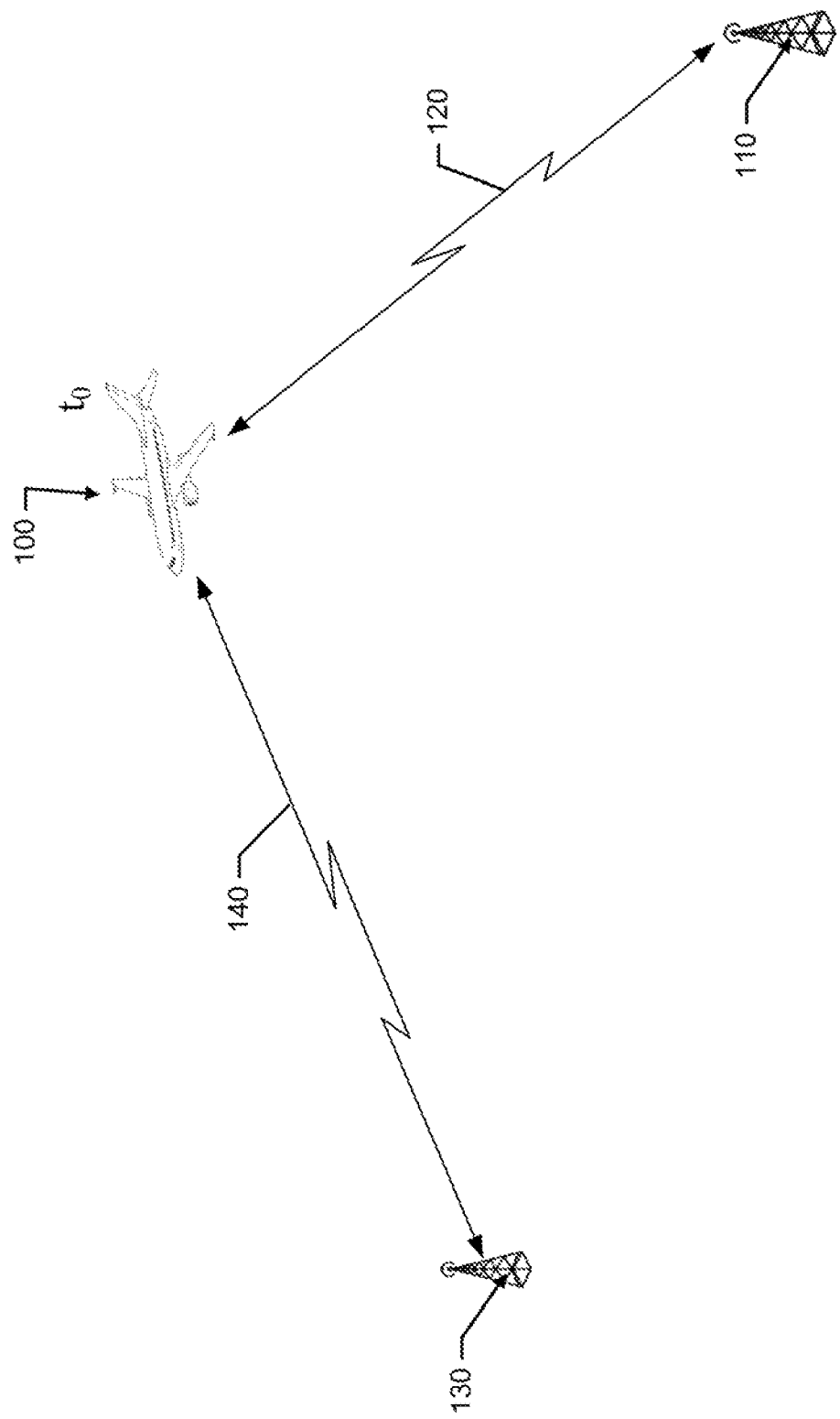
FIG. 1 illustrates an aircraft moving through the coverage areas of different base stations over time in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, the terms "data," "content," "information" and similar terms may be used interchangeably to refer to data capable of being transmitted, received, processed and/or stored in accordance with example embodiments. Thus, use of any such terms should not be taken to limit the spirit and scope of example embodiments.

As used herein, the terms "component," "module," and the like are intended to include a computer-related entity, such as but not limited to hardware, firmware, or a combination of hardware and software. For example, a component or module may be, but is not limited to being, a process running on a processor, a processor, an object, an executable, a thread of execution, and/or a computer. By way of example, both an application running on a computing device and/or the computing device can be a component or module. One or more components or modules can reside within a process and/or thread of execution and a component/module may be localized on one computer and/or distributed between two or more computers. In addition, these components can execute from various computer readable media having various data structures stored thereon. The components may communicate by way of local and/or remote processes such as in accordance with a signal having one or more data packets, such as data from one component/module interacting with another component/module in a local system, distributed system, and/or across a network such as the Internet with other systems by way of the signal. Each respective component/module may perform one or more functions that will be described in greater detail herein. However, it should be appreciated that although this example is described in terms of separate modules corresponding to various functions performed, some examples may not necessarily utilize modular architectures for employment of the respective different functions. Thus, for example, code may be shared between different modules, or the processing circuitry itself may be configured to perform all of the functions described as being associated with the components/modules described herein. Furthermore, in the context of this disclosure, the term "module" should not be understood as a nonce word to identify any generic means for performing functionalities of the respective modules. Instead, the term "module" should be understood to be a modular component that is specifically configured in, or can be operably coupled to, the processing circuitry to modify the behavior and/or capability of the processing circuitry based on the hardware and/or software that is added to or otherwise operably coupled to the processing circuitry to configure the processing circuitry accordingly.

As mentioned above, some example embodiments may provide improved connectivity to support real-time, optimal management of flight paths. Some example embodiments may therefore implement a computer executable application or module, employed via air-to-ground, air-to-air, or satellite communication-based aircraft connectivity. The application or module may employ methods for dynamic flight path management for computing and optimizing flight paths. The capability disclosed herein may be implemented using trajectory optimization methods employing (for example) kinetic, kinematic, point-mass, as well as six-degree-of-freedom path models as well.

Within the industry, the process for management of dynamically interacting flight paths is referred to as CR5DT, translated to mean Continuous Replanning of Five-Dimensional Trajectories for continuous replanning in five dimensions. Some example embodiments may employ a "Flight 5D" application module (or Destination Certainty application module), which is configured to employ the technologies described herein. The module (which may also be referred to as a continuous replanning module, or a CR5DT replanning module) provides the pilot with periodically updated advisories that account for both the external and internal factors that bound the future flight path solution space, based on the ability, through a corresponding new aviation connectivity solution, to continually ingest updated forecasts of all factors affecting all of the future of any given flight path. The approach accounts for external factors, which may include airspace exclusions, architectures and procedures; winds and temperatures aloft; storms, icing, volcanic ash and turbulence; and other air traffic, including air traffic management flow control initiatives for congestion management. Internal factors accounted for may include pilot or operator policies and preferences for desired time of arrival, avoidance of turbulence or icing or other flight hazards, fuel burn minimization, and cost minimization. Additional internal factors include current and future aircraft weight, speed, configuration of landing gear and controls, and effects on performance of abnormal conditions such as failure of an engine or other aircraft system such as cabin environmental, hydraulics, electrical, communications systems, or other factor affecting otherwise normal flight operations. Collectively, the combination of these variables and constraints create a flight path management challenge that no pilot, flight crew, or fleet manager can continually update to achieve optimal solutions for a complete flight path from origin or current position to destination, during flight. The consequence is that today is that flight paths are managed in humanly practical ways that create waste and inefficiencies in flight path and airspace performance. Example embodiments described herein enable solutions while reducing pilot and dispatcher workloads and increasing fidelity and accuracy of flight path management.

Advancements in flight planning and flight plan management have been stymied by the prior non-availability of two key interdependent capabilities, (1) computational means for optimal trajectory re-planning under changing conditions, and (2) data communications means for accessing, exchanging, and ingesting the information required for the flight path optimization computations in fast-time (future time). The interdependence between these computational and communications capabilities has been the major factor limiting progress in the deployment of the capability described herein.

Example embodiments may be implemented in a variety of computing and communications architectures involving airborne and ground (Cloud)-based alternatives. A Flight 5D app could be operated as a Web service or desktop application if supplied with all the data required for the computational optimization of the flight path and a data communication link to and from the aircraft. The Flight 5D application module may be executed on any number of computing platforms, including mobile devices such as smart phones or tablet-based personal electronic devices, or in the avionics panel of an aircraft, or in devices that provide aural, tactile, or visual cues or are "wearable" by pilots. Further, Flight 5D computations can be effectively conducted in data centers (or the "Cloud") as means of alternative architectures for generating and providing advisories to the pilot or a dispatcher, where the advisories are provided wirelessly to the aircraft while in-flight. In the case of either airborne or ground (cloud)-based computations, the vital capabilities include bandwidth-enabled access to the data and information required and the means of computing the data-driven flight path advisories for the aircraft operator. The application module provides pilots with continuously updated information about the best heading, speed, altitude, routing, and rate of climb/descent to fly from wherever they are in the airspace, to their primary or alternate destination, and, in addition, provides pilots with diagnostic information about the trajectory options among which they can choose.

Generating these flight trajectory solutions requires a computational platform that has sufficient speed and is fed by sufficient data to produce advisory information that is relevant in real-time and in fast-time. Through the integration of a computational platform in a system that includes Air-to-Ground (ATG) 4G LTE WiFi access (for example) and/or ADS-B 978 MHz UAT FIS-B and TIS-B data (for example), the application module, for the first time, can generate regular updates to flight path optimizations that satisfy user preferences and policies for path objectives. An example of an ATG access system that may employ an example embodiment is described below. However, it should be appreciated that example embodiments may also employ air-to-air or satellite components in some cases, either alone or in combination with each other and ATG components.

Typical wireless communication systems include end-user devices, which may be used at a particular location or in a mobile setting, and a fixed set of equipment with access to interconnection to the Internet and/or the Public Switched Telephone Network (PSTN). The end user device communicates wirelessly with the fixed equipment, referred to as the base station. In an ATG context, the base station is one of a plurality of base stations that are deployed on the ground (or in the air) to be partially overlapping with adjacent base stations to provide continuous and uninterrupted coverage over a particular geographic area, while the mobile equipment includes devices on various aircraft. The base stations are interconnected with each other to form a network, and may also be interconnected with other networks via a backhaul network or assembly.

In some examples, the ATG network may be designed to employ beamforming technology to communicate more efficiently and reliably. In this regard, for example, beams may be formed at or steered to desirable locations within a coverage area of a cell defined by a base station (or an aircraft) to extend range, reduce interference, and provide other enhanced communication capabilities. Whether the beams are steered or formed within this context, the control of the beams may be referred to as beamforming, and may be controlled by a beamforming control module. In some embodiments, the beamforming control module may be provided at mobile nodes of an air-to-ground network (e.g., aircraft), base stations of the network, and or at a network controller either at a central network location or in the Cloud. The beamforming control module may utilize position information of both the base stations and the mobile nodes to determine (predictively or in real-time) where to steer beams to ensure continuous communication can be maintained both within an individual cell and when a handover to another cell is desirable.

In some embodiments, a base station employing beamforming may employ an antenna array to generate (e.g., form) or steer beams in the direction of the target device, enhancing the coverage range when the location of the device is known relative to the base station. When the location of the device is not known to the base station, then a beam may not be formed in the direction of the target device and the coverage range of the base station would effectively be reduced. To address this potential problem, it may be possible to utilize current and future position information of receiving stations and base stations to facilitate beamforming at either or both ends of the wireless communication links that are to be established.

In an ATG communications system, the end-user equipment (or receiving stations) may be installed or otherwise present on an aircraft or other aerial platform. Thus, as mentioned above, the utilization of position information may not simply involve knowledge of latitude and longitude, relative positioning, global positioning system (GPS) coordinates, and/or the like. Instead, knowledge of three dimensional (3D) position information including altitude may be required. Speed, course, and any other information descriptive of the current 3D position and likely future positions may also be helpful in some cases. When the 3D position of aircraft (or communication devices thereon) is known at a current time and in future time, this location- and time specific information may be employed by the wireless system to enhance the initial synchronization coverage range by enhancing beamforming. This 5D knowledge may also enhance the ability to track the trajectory of the aircraft and other aircraft to allow fully comprehensive communication of data in two directions to substantially enhance the quality of advisory services that react to real time internal and external factors.

In some cases, the knowledge of locations of fixed assets (i.e., base stations) may be known in advance and, for example, may be stored at a location accessible to any or all assets of the network. Knowledge of movable device locations (e.g., aircraft) may be actively tracked for all devices (e.g., all aircraft or other known receiving devices on the aircraft) in the 3D airspace. As an example, aircraft (or devices thereon) taking off from an airport may access and synchronize with a base station near the airport. Once known to the wireless system, each device may periodically transmit position information (e.g., coordinates, altitude, and speed) to the serving base station. The base station may share the position information with a centralized server or other device in the core network, or in the Cloud. The centralized server (or other processing device) may then track each device, compare the device location against a database of base stations in the system, and determine when a particular device may be moving into a different base station's coverage area. The device location may be shared with the new base station, and the new base station may then form a directional beam toward the wireless device to share synchronization information.

Example embodiments may therefore combine knowledge of fixed base stations positions with knowledge of moving receiving station positions (e.g., in 5D) to provide beamforming from both the aircraft (or devices thereon) and the base station when the device has not yet acquired a neighboring base station. Full beamforming coverage benefits may therefore be maintained within an ATG system, reducing the cost of network coverage and improving handoff reliability. The improved gain by using directed beams may enable aircraft to engage in communications with potentially distant base stations on the ground. Accordingly, an ATG network may potentially be built with base stations that are much farther apart than the typical distance between base stations in a terrestrial network.

With the ability to communicate with aircraft (and devices thereon) via focused and high-bandwidth, low latency beams established, communication of data to and from the aircraft can be greatly enhanced. Processing capabilities provided on the aircraft, on the ground, and/or in the cloud, may therefore be similarly enhanced to provide full integration of real time data into trajectory management for continuous replanning of dynamically interacting trajectories for optimal economic and safety related outcomes.

FIG. 1 illustrates a conceptual view of an aircraft moving through a coverage zone of different base stations to illustrate an example embodiment. As can be seen in FIG. 1, an aircraft 100 may be in communication with a first base station (BS) 110 at time $t_0$ via a wireless communication link 120. The aircraft 100 may therefore include wireless communication equipment onboard that enables the aircraft 100 to communicate with the first BS 110, and the first BS 110 may also include wireless communication equipment enabling communication with the aircraft 100. As will be discussed in greater detail below, the wireless communication equipment at each end may include radio hardware and/or software for processing wireless signals received at corresponding antenna arrays that are provided at each respective device in communication with their respective radios. Moreover, the wireless communication equipment of example embodiments may be configured to employ beamforming techniques to utilize directive focusing, steering, and/or formation of beams using the antenna arrays. Accordingly, for the purposes of this discussion, it should be assumed that the wireless communication link 120 between the aircraft 100 and the first BS 110 may be formed using at least one link established via beamforming. In other words, either the first BS 110 or the aircraft 100, or both, may include radio control circuitry capable of employing beamforming techniques for establishment of the wireless communication link 120.

The first BS 110 has a fixed position geographically and therefore position information regarding the location of the first BS 110 can be known. In some cases, an estimate of the coverage area defining the region in which first BS 110 is capable of providing wireless connectivity to aircraft may also be known or estimable (e.g., at the aircraft 100 and/or at the first BS 110 or another network location). Meanwhile, the position of the aircraft in 3D space may also be known or estimable at any given time (e.g., at the aircraft 100 and/or at the first BS 110 or another network location). Furthermore, it should be appreciated that the coverage area of the first BS 110 may possibly be altitude dependent, in some cases. In this regard, for example, the latitudinal and longitudinal coverage area projected onto the surface of the earth for the first BS 110 may be differently sized for different altitudes. Accordingly, for example, based on the known position and coverage characteristics of the first BS 110 and the position information of the aircraft 100 at time $t_0$, it may be determinable that the aircraft 100 is nearing or at the edge of the coverage area of the first BS 110 at time $t_0$.

A second BS 130, which may have similar performance and functional characteristics to those of the first BS 110, may be located geographically such that, for the current track or trajectory of the aircraft 100, the second BS 130 is a candidate for handover of the aircraft 100 to maintain a continuous and uninterrupted communication link between the aircraft 100 and ground-based base stations of an ATG wireless communication network at time $t_0$. As discussed above, it may be helpful for the second BS 130 to be aware of the approach of the aircraft 100 so that the second BS 130 can employ beamforming techniques to direct a beam toward the aircraft 100 either when or prior to the aircraft 100 reaching the coverage area of the second BS 130. Additionally or alternatively, it may be helpful for the aircraft 100 to be aware of the existence and location of the second BS 130 so that the wireless communication equipment on the aircraft 100 may employ beamforming techniques to direct a beam toward the second BS 130 either when or prior to the aircraft 100 reaching the coverage area of the second BS 130. Thus, at least one of the second BS 130 or the wireless communication equipment on the aircraft 100 may employ beamforming techniques assisted by knowledge of position information to facilitate establishment of the wireless communication link 140 between the wireless communication equipment on the aircraft 100 and the second BS 130. The handover of the aircraft 100 from the first BS 110 to the second BS 130 at time $t_0$ may be followed by service of the aircraft 100 being provided by the wireless communication link 140 and the second BS 130.

Figure 2:
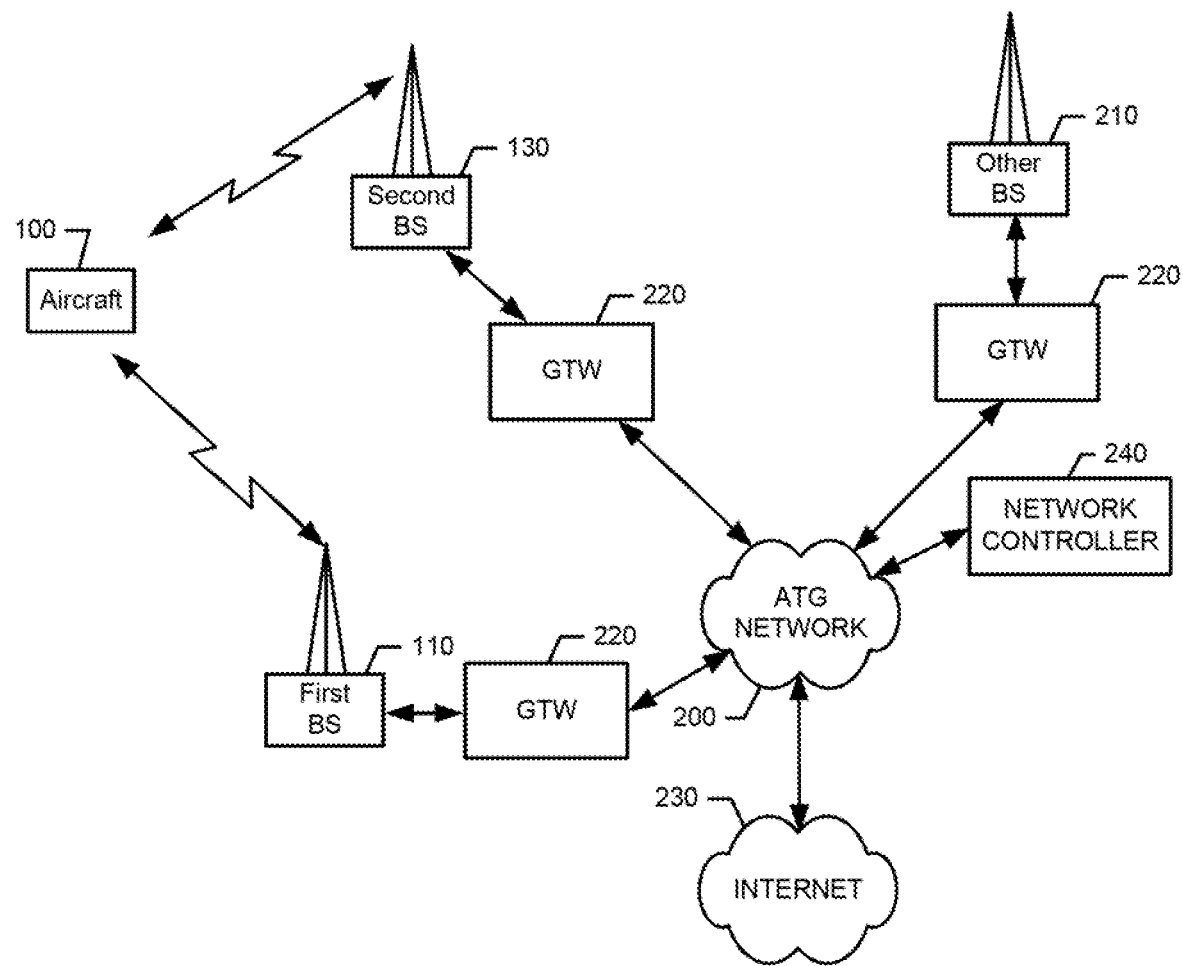
FIG. 2 illustrates a block diagram of a system for employing an aviation advisory module in accordance with an example embodiment.

In accordance with an example embodiment, a beamforming control module may be provided that employs both 2D knowledge of fixed base station location and at least 3D knowledge (perhaps 4D or 5D knowledge in some cases) of position information regarding a receiving station on an aircraft to assist in application of beamforming techniques. The beamforming control module of an example embodiment may be physically located at any of a number of different locations within an ATG communication network. For example, the beamforming control module may be located at the aircraft 100, at either or both of the first and second BS 110 and 130, or at another location in the network or in the Cloud. Similarly, a Flight 5D application module of an example embodiment may also be located at the aircraft 100, at either or both of the first and second BS 110 and 130, or at another location in the network or in the cloud. FIG. 2 illustrates a functional block diagram of an ATG communication network that may employ an example embodiment of such the flight 5D application module.

As shown in FIG. 2, the first BS 110 and second BS 130 may each be base stations of an ATG network 200. The ATG network 200 may further include other BSs 210, and each of the BSs may be in communication with the ATG network 200 via a gateway (GTW) device 220. The ATG network 200 may further be in communication with a wide area network such as the Internet 230 or other communication networks. In some embodiments, the ATG network 200 may include or otherwise be coupled to a packet-switched core network.

In an example embodiment, the ATG network 200 may include a network controller 240 that may include, for example, switching functionality. Thus, for example, the network controller 240 may be configured to handle routing calls to and from the aircraft 100 (or to communication equipment on the aircraft 100) and/or handle other data or communication transfers between the communication equipment on the aircraft 100 and the ATG network 200. In some embodiments, the network controller 240 may function to provide a connection to landline trunks when the communication equipment on the aircraft 100 is involved in a call. In addition, the network controller 240 may be configured for controlling the forwarding of messages and/or data to and from the mobile terminal 10, and may also control the forwarding of messages for the base stations. It should be noted that although the network controller 240 is shown in the system of FIG. 2, the network controller 240 is merely an exemplary network device and example embodiments are not limited to use in a network employing the network controller 240.

The network controller 240 may be coupled to a data network, such as a local area network (LAN), a metropolitan area network (MAN), and/or a wide area network (WAN) (e.g., the Internet 230) and may be directly or indirectly coupled to the data network. In turn, devices such as processing elements (e.g., personal computers, laptop computers, smartphones, server computers or the like) can be coupled to the communication equipment on the aircraft 100 via the Internet 230.

Although not every element of every possible embodiment of the ATG network 200 is shown and described herein, it should be appreciated that the communication equipment on the aircraft 100 may be coupled to one or more of any of a number of different networks through the ATG network 200. In this regard, the network(s) can be capable of supporting communication in accordance with any one or more of a number of first-generation (1G), second-generation (2G), third-generation (3G), fourth-generation (4G) and/or future mobile communication protocols or the like. In some cases, the communication supported may employ communication links defined using unlicensed band frequencies such as 2.4 GHz or 5.8 GHz. However, communications may be supported by other frequencies in licensed bands additionally or alternatively. Moreover, it may be possible to switch between licensed and unlicensed band communications (and/or satellite communications) under the control of the network controller 240 in some cases. Additionally, in some cases, the ATG network 200 may be augmented by or operate in parallel with an air-to-air or satellite communication system and switching may be performed to handle communications alternately between either the ATG network 200, the air-to-air system or the satellite communications system in some cases under the control of the network controller 240.

As indicated above, a Flight 5D application module may be employed on electronic equipment at either or both of the network side or the aircraft side in example embodiments. Thus, in some embodiments, the Flight 5D application module may be implemented in a receiving station on the aircraft (e.g., a passenger device or device associated with the aircraft's communication system). In some embodiments, the Flight 5D application module may be implemented in the network controller 240 or at some other network side entity. Moreover, in some cases, the Flight 5D application module may be implemented at an entity located in the cloud (e.g., at a location that is operably coupled to the ATG network 200 via the Internet 230).

Figure 3:
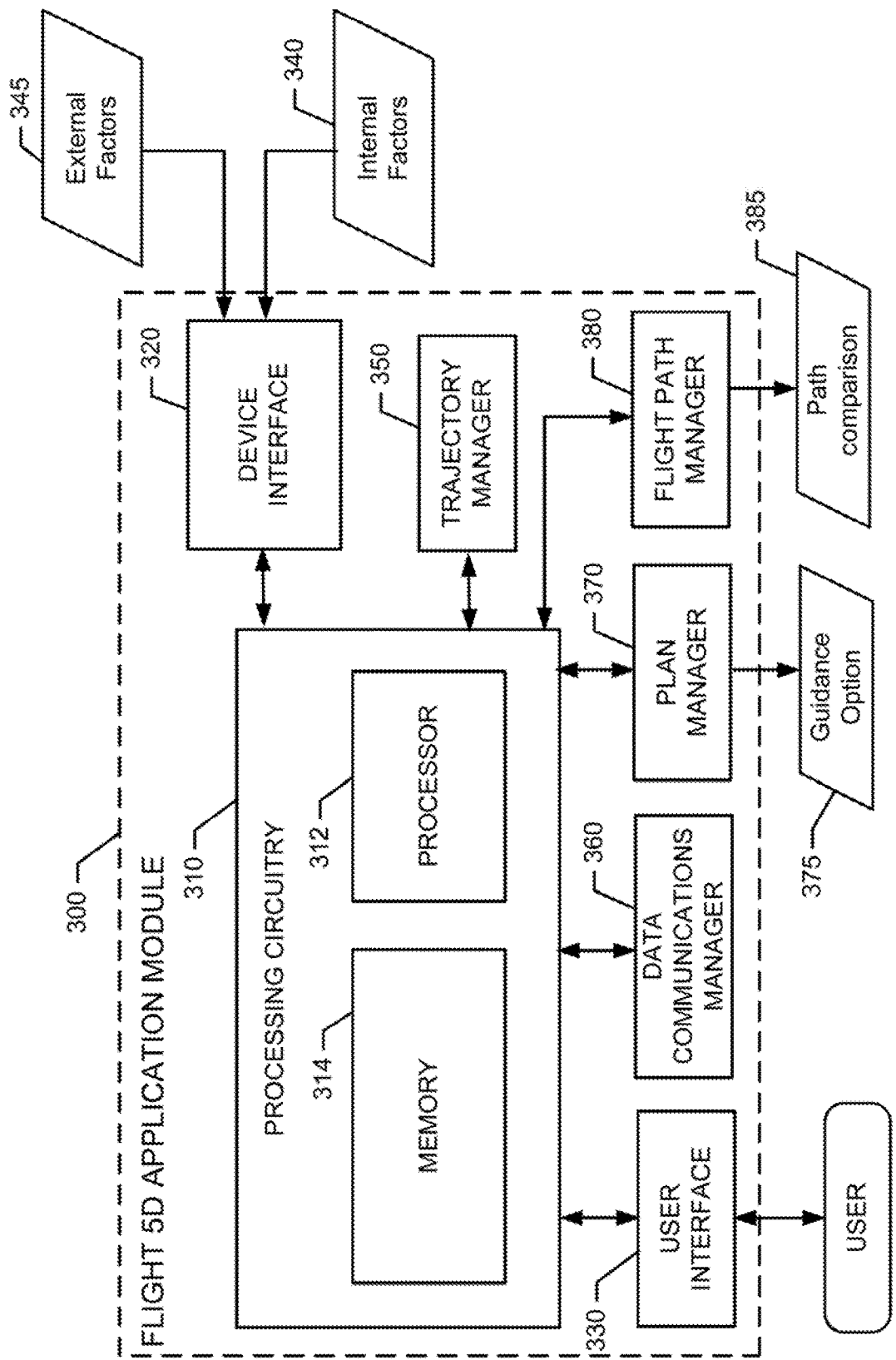
FIG. 3 illustrates a flight 5D application module according to an example embodiment.

FIG. 3 illustrates the architecture of a Flight 5D application module 300 in accordance with an example embodiment. The Flight 5D application module 300 may include processing circuitry 310 configured to receive information indicative of internal and external factors for processing as described herein. The processing circuitry 310 may be configured to perform data processing, control function execution and/or other processing and management services according to an example embodiment of the present invention. In some embodiments, the processing circuitry 310 may be embodied as a chip or chip set. In other words, the processing circuitry 310 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 310 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 310 may include one or more instances of a processor 312 and memory 314 that may be in communication with or otherwise control a device interface 320 and, in some cases, a user interface 330. As such, the processing circuitry 310 may be embodied as a circuit chip (e.g., an integrated circuit chip) configured (e.g., with hardware, software or a combination of hardware and software) to perform operations described herein. However, in some embodiments, the processing circuitry 310 may be embodied as a portion of an on-board computer, or other device on the aircraft 100, or a device at any portion of the ATG network 200. In some embodiments, the processing circuitry 310 may communicate with various components, entities and/or sensors of the ATG network 200 to receive the external factors.

The user interface 330 (if implemented) may be in communication with the processing circuitry 310 to receive an indication of a user input at the user interface 330 and/or to provide an audible, visual, mechanical or other output to the user. As such, the user interface 330 may include, for example, a display (e.g., a touchscreen or other display), a keyboard, a mouse, speakers, one or more levers, switches, indicator lights, buttons or keys (e.g., function buttons), and/or other input/output mechanisms capable of delivering audible, visual, haptic or other outputs.

The device interface 320 may include one or more interface mechanisms for enabling communication with other devices (e.g., modules, entities, sensors and/or other components of the ATG network 200 or on the aircraft 100 itself when the flight 5D application module 300 is instantiated on the aircraft 100). In some cases, the device interface 320 may be any means such as a device or circuitry embodied in either hardware, or a combination of hardware and software that is configured to receive and/or transmit data from/to modules, entities, sensors and/or other components of the ATG network 200 that are in communication with the processing circuitry 310.

The processor 312 may be embodied in a number of different ways. For example, the processor 312 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 312 may be configured to execute instructions stored in the memory 314 or otherwise accessible to the processor 312. As such, whether configured by hardware or by a combination of hardware and software, the processor 312 may represent an entity (e.g., physically embodied in circuitry—in the form of processing circuitry 310) capable of performing operations according to embodiments of the present invention while configured accordingly. Thus, for example, when the processor 312 is embodied as an ASIC, FPGA or the like, the processor 312 may be specifically configured hardware for conducting the operations described herein. Alternatively, as another example, when the processor 312 is embodied as an executor of software instructions, the instructions may specifically configure the processor 312 to perform the operations described herein.

In an example embodiment, the processor 312 (or the processing circuitry 310) may be embodied as, include or otherwise control the operation of the flight 5D application module 300 based on inputs received by the processing circuitry 310 including information associated with the internal factors 340 and/or external factors 345. External factors 345 may include, for example, the airspace and environment within which an aircraft operates. Internal factors 340 may include, for example, pilot or fleet manager objectives and preferences related to aircraft operations. Additional internal factors include current and future aircraft weight, speed, configuration of landing gear and controls, and effects on performance of abnormal conditions such as failure of an engine or other aircraft system such as cabin environmental, hydraulics, electrical, communications systems, or other factor affecting otherwise normal flight operations. Thus, for example, the external factors 345 may include airspace exclusions, architectures and procedures, winds and temperatures aloft, storms, icing, volcanic ash, turbulence, and other air traffic, including air traffic management flow control initiatives for congestion management. Internal factors 340 may further include pilot or operator policies and preferences for desired time of arrival, avoidance of turbulence or icing or other flight hazards, fuel burn minimization, and cost minimization, pilot skill level (e.g., based on flight hours, currency, and/or ratings).

As such, in some embodiments, the processor 312 (or the processing circuitry 310) may be said to cause each of the operations described in connection with the Flight 5D application module 300 in relation to processing the internal and/or external factors 340 and 345 to undertake the corresponding functionalities relating to providing continuous replanning of dynamically interacting trajectories to generate a guidance output (e.g., a pilot advisory recommendation regarding path optimization options) responsive to execution of instructions or algorithms configuring the processor 312 (or processing circuitry 310) accordingly.

In an exemplary embodiment, the memory 314 may include one or more non-transitory memory devices such as, for example, volatile and/or non-volatile memory that may be either fixed or removable. The memory 314 may be configured to store information, data, applications, instructions or the like for enabling the processing circuitry 310 to carry out various functions in accordance with exemplary embodiments of the present invention. For example, the memory 314 could be configured to buffer input data for processing by the processor 312. Additionally or alternatively, the memory 314 could be configured to store instructions for execution by the processor 312. As yet another alternative, the memory 314 may include one or more databases that may store a variety of data sets responsive to input sensors and components. Among the contents of the memory 314, applications and/or instructions may be stored for execution by the processor 312 in order to carry out the functionality associated with each respective application/instruction. In some cases, the applications may include instructions for providing inputs to control operation of the Flight 5D application module 300 as described herein.

In an example embodiment, the memory 314 may store the internal factors 340 and may also store (temporarily or permanently) external factors 345 including dynamic parameters that are provided continually or periodically as updates. The processing circuitry 310 may be configured to process all materials received (e.g., at a mobile communication station (which should be appreciated to be capable of transmission and reception of signaling in connection with two-way communication)). The mobile communication station may be a wireless communication device onboard the aircraft 100, or may be a wireless communication device of the aircraft 100 itself. The wireless communication device of the aircraft 100 may transfer information to and from passenger devices (with or without intermediate storage), or may transfer information to and from other aircraft communications equipment (with or without intermediate storage).

The Destination Certainty application module (e.g., the Flight 5D application module 300) may be implemented in a system that comprises additional modules that may each include their own respective processing circuitry components, or that may operate under the control of the processing circuitry 310. The modules of or in communication with the Flight 5D application module 300 may include components that operate in connection with or as parts of the device interface 320 and/or the user interface 330.

In an example embodiment, the Flight 5D application module 300 may include or otherwise be in communication with a trajectory manager 350. The trajectory manager 350 may be embodied as a computational engine for flight path (trajectory) management. An example of a suitable computational engine capable of continuous re-planning of five-dimensional trajectories, is disclosed in commonly assigned U.S. Pat. No. 8,594,917, entitled "Method And Apparatus For Dynamic Aircraft Trajectory Management" and U.S. Pat. No. 8,554,458, entitled "System and Method for Planning, Disruption Management, and Optimization of Networked, Scheduled or On-Demand Air Transport Fleet Trajectory Operations," the contents of each of which are hereby incorporated by reference in their entireties.

The Flight 5D application module 300 may also include or be in communication with a data communication manager 360. The data communications manager 360 may be embodied as a data communications facility capable of integration with the computational engine of the trajectory manager 350 for flight path (trajectory) management, while also managing real-time ATG network communications (or other communications to the aircraft 100) that provide real-time data that relates to one or both of the internal and external factors 340 and 345. As such, the data communications manager 360 may be embodied as a communications facility capable of accessing and ingesting the information required for the computations in fast-time (i.e., future time).

In an example embodiment, the flight 5D application module 300 may also include or be in communication with a plan manager 370. The plan manager 370 may be embodied as a graphics engine configured to generate a graphical depiction of a guidance option 375 in the form of a plan or option for the flight path (that may be provided to the user via the user interface 330). The guidance option (or plan) may be provided in four dimensions (e.g., latitude, longitude, elevation, and time) to the pilot of the aircraft 100 to provide intuitive insights into advisory information provided by the flight 5D application module 300, for pilot decision-making.

In some examples, the flight 5D application module 300 may also include or be in communication with a flight path manager 380. The flight path manager 380 may also be embodied as a graphics engine, which could be the same or a different graphics engine relative to the graphics engine of the plan manager 370 described above. Thus, the flight path manager 380 could be a separate component, or could effectively be a module or functionally separate part of the plan manager 370. Regardless of how embodied, the flight path manager 380 may be configured to generate graphical and textual presentations of solution diagnostics and comparative benefits of various flight plan options. Thus, for example, the flight path manager 380 may be configured to compare flight path A, versus flight path B, versus flight path C, etc., in terms of any of time, fuel, distance, cost, and/or other parameters of pilot and/or passenger preference. The flight path manager 380 may then be configured to provide a path comparison 385 (e.g., via the user interface 330) to illustrate the comparison in whatever terms are requested by the user or configured for presentation according to preferences that can be provided (and changed) by the user. The path comparison 385 may also provide path diagnostic information in graphical or textual form to the pilot, explaining the rationale behind updated path advisories.

As discussed above, the Flight 5D application module 300 may be configured to generate optimized solutions for the external factors 345 and the internal factors 340 that are provided including, at least in part, data that is received on or from the aircraft 100 via real-time wireless communications (e.g., via the ATG network 200). The internal and external factors 340 and 345 may therefore include dynamic and/or fixed parameters of various types, and the parameters may constrain the optimization of solutions. The dynamic parameters may include atmospheric parameters, airspace parameters, and aircraft parameters. At least some of these dynamic parameters may be communicated in real time (e.g., via the ATG network 200) either to or from the aircraft 100 for use at the flight 5D application module 300 (regardless of where the flight 5D application module 300 is located).

Some examples of atmospheric parameters that may constrain optimization solutions includes the following data for current and forecast conditions (among others that may be developed by weather information service providers in the future):

Current Weather (Depictions, Freezing Levels, Precipitation, etc.)
    Winds Aloft (including Jet Stream, etc.)
    Surface Winds
    Temperatures Aloft
    Temperature-Dew Point data
    Visibilities (including runway visual ranges (RVRs), etc.)
    Ceiling
    Sky Coverage
    Radar Images (Composite and Tilt-specific, including gridded weather products)
    Satellite Cloud Cover
    Color Infrared (IR) Cloud Cover
    Mosaic Echo Tops, etc.
    Volcanic Ash
    Adverse Weather Conditions (AIRMETs, SIGMETs, etc.)
    Thunderstorm and Severe Weather Forecast
    Uncrewed Aerial Systems (UAS) Operating Areas
    Icing
    Turbulence
    Pilot Reports (PiReps)
    Meteorological Terminal Aviation Routine (METAR) weather reports
    Terminal Aerodrome Forecasts (TAFs)
    Center Weather Advisories.

The National Airspace System (NAS) parameters (or simply, airspace parameters) that may constrain flight path optimization solutions include the following information for current and forecast traffic conditions: Temporary Flight Restrictions (TFRs)

Special Use Airspace (MOAs, Restricted Areas, Firing Areas, etc.)
    Air Traffic Control Traffic Management Initiatives (TMIs)
    Notices to Airmen (NOTAMs)
    Airport Configuration Changes
    ATC Preferred Routing
    ATC Approved Routing
    Ground Delay Programs
    Time-Based Flow Management
    Airspace Flow Programs
    Ground Stops
    Coded Departure Routes
    And others.

The aircraft parameters required to be incorporated in the flight path optimization process include the following:

Current and forecast aircraft weight (based on fuel and oil consumption measurement or modeling)
    Aircraft configuration (flaps and landing gear positions, for example)
    Aircraft Center of Gravity, current and forecast (for trim drag computation)
    Aircraft-based measurement of atmospheric conditions affecting aircraft performance calculations
    Pilot or dispatcher preferences and policies for each of the following flight path objectives:
    Minimum path length
    Minimum path time
    Required time of arrival
    Minimum path fuel
    Minimum path cost
    Tradeoff costs between path cost for engine reserves versus for fuel consumption
    Minimum path turbulence
    Minimum path icing
    Maximum allowable crosswind and tailwind for takeoff and landing
    Minimum runway length requirements
    Maximum fuel cost (for refueling stop optimization)
    And others
    Aircraft-based constraints on flight path options during the optimization process, including a complete digital representation of the current flight trajectory (for example as defined in the RTCA SC214 protocol or newer protocols to be developed for Trajectory-Based Operations (TBO) airspace.)
    And others.

Accordingly, for example, the Flight 5D application module 300 may be configured to consider internal factors and external factors related to route optimization in light of at least some dynamic parameters that are communicated in real time to and/or from the aircraft 100 while in-flight (e.g., over a robust, low-latency, high-bandwidth) wireless communication link with the aircraft 100 (e.g., via the ATG network 200). Thus, the Flight 5D application module 300 considers deconfliction of multiple aircraft trajectories (e.g., via the trajectory manager 350), but also receives real time dynamic updates (e.g., via the data communications manager 360) to conditions that may affect the flight path of the aircraft 100. Based on the dynamic parameters, the plan manager 370 may consider all factors that may impact flight path optimization (e.g., relative to internal factors set by the pilot or an operator, and external factors that may be dynamically changing) to output the guidance option 375 graphically. The flight 5D application module 300 may also provide (again graphically) a visual comparison of multiple options to the pilot or operator via the flight path manager 380.

In a ground-based computation-communication architecture for the disclosed capability, the ability to incorporate the dynamic parameters into a flight path optimization process requires a robust, low-latency, high-bandwidth return link from the aircraft 100 to the ground, for a ground (or cloud)-based computation of path advisories to be re-transmitted to the aircraft 100. However, although the link from the ground to the aircraft 100 has historically been able to be sufficiently large to support such operations, the return link has historically been inadequate to support such a dynamically responsive advisory system. In an airborne-based computation-communication architecture, the ability to perform these computations in a fashion useful for real- and fast-time airborne deconfliction of the path with airspace hazards similarly requires such a return link from the aircraft for air-to-air sharing of optimal flight path intent and internal aircraft parameters affecting the path optimization process. Example embodiments employ the ATG network 200 with a return link that is capable of delivering at least 1 to 2 Mbps (representing about 50% of the forward link (i.e., ground-to-air link) bandwidth). Moreover, in some cases, the ATG network 200 may include a return link that is capable of delivering at least 5 Mbps (representing about 70-80% of the ground-to-air bandwidth.

The disclosed capability integrates the computational application with the data communication system that enables a flight path to be continuously (or periodically) optimized and updated advisory information provided to the pilot, based on ever-changing current and forecast conditions for the atmosphere, the airspace and the aircraft 100, from wherever the aircraft 100 is at each moment, to the destination, based on preferences and priorities set by the aircraft operator.

The Flight 5D application module 300 (or destination certainty application module), interdependently supported by a high bi-directional bandwidth, low latency connectivity system, provides the first capability for pilots to gain access to advisory information on flight path management and optimization in the context of continuously changing conditions, and user policies and preferences. The Flight 5D application module 300 is generally founded on the concept of continuous re-planning of dynamically interacting flight paths (trajectories) to provide pilot advisories that, for the first time, enable trajectory selection to be made by pilots based on preferences, economics and safety. The Flight 5D application module 300 is configured to ingest data about observations and forecasts of atmospheric conditions, airspace status, and traffic, through data communications technology, to make the computations of future flight paths that satisfy user preferences, trajectory economics, and safety.

The capability described herein may be of significant value for improving safety and efficiency for current operations of commercial, business, general aviation and unscrewed aerial systems (UAS) aircraft operations worldwide. The capability may also be of significant value in future envisioned "Urban VTOL" and "Thin Haul" air taxi operating concepts, for enabling these high-density traffic systems to operate with safety and efficiency. The capability may also create advanced utility to the operations of Flight Operational Quality Assurance (FOQA) systems by providing a high-quality, high-fidelity baseline flight path for comparative analysis for pilot-flown paths.

In some embodiments, the Flight 5D application module 300 may be disposed at the aircraft 100. However, the flight 5D application module 300 may be disposed at the network controller 240, any ground station, locations in the cloud, or any other location that may be in communication with the base stations and/or aircraft of the ATG network 200. In some example embodiments, the Flight 5D application module 300 may further be configured to operate in a mobile mesh network context. For example, the flight 5D application module 300 may be configured to utilize dynamic position information associated with multiple aircraft in order to form mesh communication links between aircraft. Thus, for example, one or multiple aircraft (in a packet-based system) could relay information to another aircraft from a terrestrial base station. In such an example, the dynamic parameters may be provided to and/or from multiple in-flight aircraft. In some embodiments, multiple "hops" between aircraft may be accomplished to reach remotely located aircraft, or even to provide self-healing in a network where a particular ground station is not operating, but there are other aircraft in the area that can relay information to fill in the coverage gaps left by the non-operating ground station.

The system of FIG. 2 may therefore include one or more Flight 5D (or destination certainty) application modules 300 at one or more corresponding locations within the system. Regardless of the number and locations of such modules, the information associated therewith may be used to generate guidance options 375 and/or path comparisons and diagnostics 385 that can be provided, for example, to an operator and/or a pilot at either end of a two way communication link. Example embodiments may therefore provide highly capable, in-flight advisory services that consider dynamic parameters and the desires or business imperatives of a pilot or operator. Proactive resource management, safety related advisory services, and other activities may then be undertaken to improve system performance and customer satisfaction.

Figure 4:
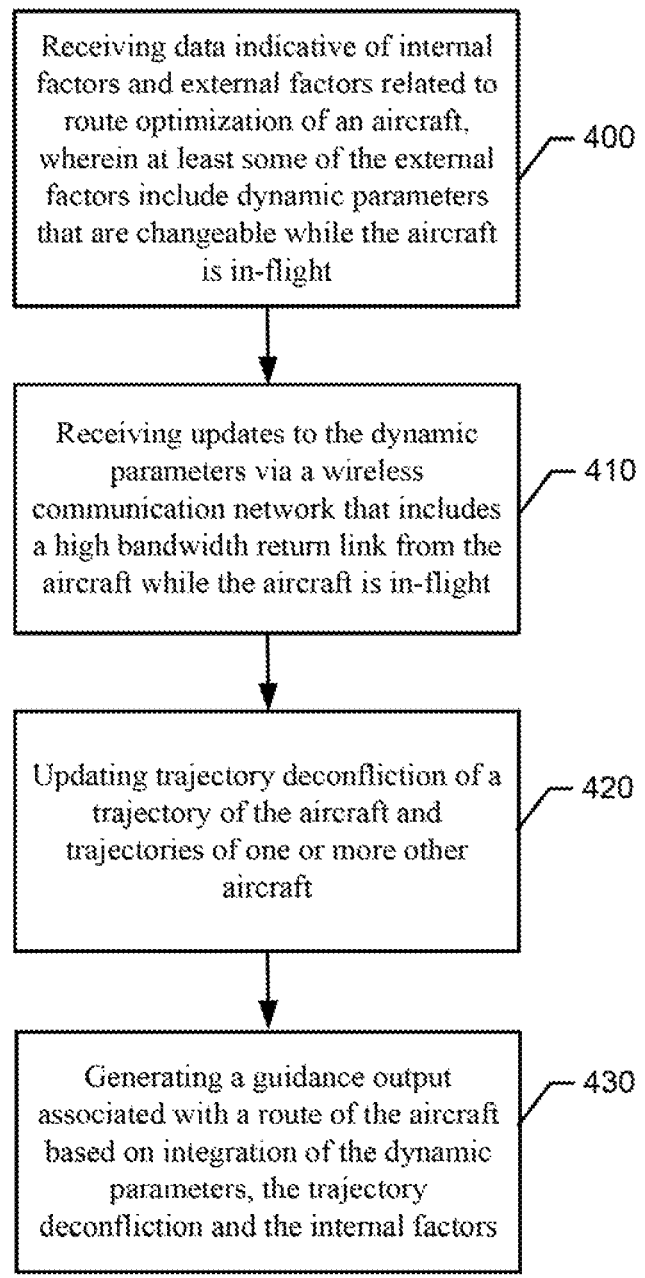
FIG. 4 illustrates a block diagram of a method for performing an example advisory related function in accordance with an example embodiment.

As such, the system of FIG. 2 may provide an environment in which the aviation advisory or control module of FIG. 3 may provide a mechanism via which a number of useful methods may be practiced. FIG. 4 illustrates a block diagram of one method that may be associated with the system of FIG. 2 and the modules of FIG. 3. From a technical perspective, the Flight 5D application module 300 described above may be used to support some or all of the operations described in FIG. 4. As such, the platform described in FIG. 2 may be used to facilitate the implementation of several computer program and/or network communication based interactions. As an example, FIG. 4 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a device (e.g., the flight 5D application module 300, and/or the like) and executed by a processor in the device. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention, as shown in FIG. 4, may include receiving data indicative of internal factors and external factors related to route optimization of an aircraft at operation 400. At least some of the external factors may include dynamic parameters that are changeable while the aircraft is in-flight. The method may further include receiving updates to the dynamic parameters via a wireless communication network that includes a high bandwidth, low latency return link from the aircraft while the aircraft is in-flight at operation 410, updating trajectory deconfliction of a trajectory of the aircraft and trajectories of one or more other aircraft at operation 420, and generating a guidance output associated with a route of the aircraft based on integration of the dynamic parameters, the trajectory deconfliction and the internal factors at operation 430. In some cases, the integration may be accomplished by generating a route score, rank or suitability rating for achieving any goals or preferences provided in the internal factors for each path or route option generated by the trajectory manager. As the dynamic parameters are received, and perhaps change, the path or route options may be updated based on impacts to the path or route options generated by the trajectory manager to effectively update the route score, rank or suitability rating. The possible routes may therefore continuously (or periodically) be updated and scored, ranked or rated to enable one or more of the best options (e.g., by score or rank) to be presented as the guidance output and/or as path comparisons.

The method described above in reference to FIG. 4 may include additional steps, modifications, augmentations and/or the like to achieve further objectives or enhance operation of the system. The additional steps, modifications, augmentations and/or the like may be added in any combination with each other. For example, in some cases, at least some of the dynamic parameters may be changed (e.g., may be modified and/or updated) substantially in real time. In some examples, the internal factors may include pilot or operator policies or preferences. In an example embodiment, the preferences may define a preferred time of arrival, preferred hazard avoidance strategy, preferred cost management strategy, and preferred fuel management strategy. In some cases, the internal factors may include a pilot skill level. In some examples, the external factors may include airspace exclusions, architectures and procedures, winds and temperatures aloft, storms, icing, volcanic ash, and turbulence. In an example embodiment, the external factors may include air traffic management flow control initiatives for congestion management. In some cases, the dynamic parameters may include atmospheric parameters, airspace parameters and aircraft parameters. In some examples, the module may be disposed on the aircraft or at a ground station. In an example embodiment, the wireless communication network may be an ATG network, and the module may be disposed at a remote location relative to the aircraft and ground stations within the ATG network. In some cases, generating the guidance output may include providing an option for a flight path to an operator at a ground station or to a pilot of the aircraft. In an example embodiment, the method may further include providing one or more other options for other flight paths and display a comparison of the flight path and the one or more other options for other flight paths. In some cases, updating the trajectory deconfliction comprises updating in real time.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. An aviation advisory module comprising processing circuitry configured to:
receive data indicative of internal factors and external factors related to route optimization of an aircraft, wherein at least some of the external factors include dynamic parameters that are changeable while the aircraft is in-flight;
receive, via a steerable return link beam from the aircraft to a first ground station, updates to the dynamic parameters via a high bandwidth return link that is at least 1 Mbps and at least 50% of a bandwidth of a forward link while the aircraft is in-flight;
responsive to a handover of the aircraft to a second ground station, receive via the steerable return link beam from the aircraft to the second ground station, further updates to the dynamic parameters;
update trajectory deconfliction of a trajectory of the aircraft and trajectories of one or more other aircraft;
generate a guidance output associated with a route of the aircraft based on integration of the dynamic parameters, the trajectory deconfliction and the internal factors, and
provide the guidance output to the aircraft via a steerable beam of the forward link from the second ground station,
wherein the module is disposed at a ground station and the handover is conducted on the forward link from the first ground station to the second ground station responsive to the second ground station providing synchronization information to the aircraft via a directional beam steered from the second ground station to the aircraft, wherein generating the guidance output comprises providing an option for a flight path to a pilot of the aircraft, and wherein the processing circuitry is further configured to provide one or more other options for other flight paths and display a comparison of the flight path and the one or more other options for other flight paths.

2. The module of claim 1, wherein at least some of the dynamic parameters are changed substantially in real time.

3. The module of claim 1, wherein the internal factors include pilot or operator preferences.

4. The module of claim 3, wherein the preferences define a preferred time of arrival, preferred hazard avoidance strategy, preferred cost management strategy, and preferred fuel management strategy.

5. The module of claim 1, wherein the internal factors include a pilot skill level.

6. The module of claim 1, wherein the external factors include airspace exclusions, architectures and procedures, winds and temperatures aloft, storms, icing, volcanic ash, and turbulence.

7. The module of claim 1, wherein the external factors include air traffic management flow control initiatives for congestion management.

8. The module of claim 1, wherein the dynamic parameters include atmospheric parameters, airspace parameters and aircraft parameters.

9. The module of claim 1, wherein the forward link and reverse link are links of a wireless communication network that comprises an air-to-ground (ATG) network.

10. The module of claim 9, wherein the module is disposed at a remote location relative to the aircraft and ground stations within the ATG network.

11. The module of claim 1, wherein updating the trajectory deconfliction comprises updating in real time.

12. The module of claim 1, wherein the internal factors include operator policies.

13. A method comprising:
receiving, at a ground based module, data indicative of internal factors and external factors related to route optimization of an aircraft, wherein at least some of the external factors include dynamic parameters that are changeable while the aircraft is in-flight;
receiving, via a steerable return link beam from the aircraft to a first ground station, updates to the dynamic parameters via a high bandwidth return link that is at least 1 Mbps and at least 50% of a bandwidth of a forward link while the aircraft is in-flight;
responsive to a handover of the aircraft to a second ground station, receiving via the steerable return link beam from the aircraft to the second ground station, further updates to the dynamic parameters;
updating trajectory deconfliction of a trajectory of the aircraft and trajectories of one or more other aircraft;
generating a guidance output associated with a route of the aircraft based on integration of the dynamic parameters, the trajectory deconfliction and the internal factors, and
providing the guidance output to the aircraft via a steerable beam of the forward link from the second ground station,
wherein the handover is conducted on the forward link from the first ground station to the second ground station responsive to the second ground station providing synchronization information to the aircraft via a directional beam steered from the second ground station to the aircraft,
wherein generating the guidance output comprises providing an option for a flight path to a pilot of the aircraft, and
wherein the processing circuitry is further configured to provide one or more other options for other flight paths and display a comparison of the flight path and the one or more other options for other flight paths.

14. The method of claim 13, wherein at least some of the dynamic parameters are changed substantially in real time.

15. The method of claim 13, wherein the internal factors include pilot or operator preferences.

16. The module of claim 15, wherein the preferences define a preferred time of arrival, preferred hazard avoidance strategy, preferred cost management strategy, and preferred fuel management strategy.

17. The method of claim 13, wherein the internal factors include operator policies.

* * * * *